(12) United States Patent
Van Mierloo et al.

(10) Patent No.: US 11,091,611 B2
(45) Date of Patent: Aug. 17, 2021

(54) POLYOLEFIN COMPOSITION

(71) Applicant: SABIC GLOBAL TECHNOLOGIES B.V., Bergen op Zoom (NL)

(72) Inventors: Sarah Van Mierloo, Geleen (NL); Mark Johannes Boerakker, Geleen (NL); Patrick Elisabeth Luc Voets, Geleen (NL); Daan Jongerius, Geleen (NL); Jacques Theodorus Elisabeth Hubertina Sampers, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 192 days.

(21) Appl. No.: 16/487,886

(22) PCT Filed: Feb. 21, 2018

(86) PCT No.: PCT/EP2018/054279
§ 371 (c)(1),
(2) Date: Aug. 22, 2019

(87) PCT Pub. No.: WO2018/153917
PCT Pub. Date: Aug. 30, 2018

(65) Prior Publication Data
US 2020/0002517 A1 Jan. 2, 2020

(30) Foreign Application Priority Data

Feb. 23, 2017 (EP) ..................... 17157575

(51) Int. Cl.
*C08L 23/06* (2006.01)
*C08K 5/134* (2006.01)
(Continued)

(52) U.S. Cl.
CPC ............ *C08L 23/06* (2013.01); *C08K 5/1345* (2013.01); *C08K 5/52* (2013.01); *C08L 23/12* (2013.01);
(Continued)

(58) Field of Classification Search
CPC .......... C08L 23/00; C08L 23/06; C08L 23/12
See application file for complete search history.

(56) References Cited

U.S. PATENT DOCUMENTS 3,766,061 A 10/1973 Mahler et al.
3,975,288 A 8/1976 Davis
(Continued)

FOREIGN PATENT DOCUMENTS

EP 2077269 B1 1/2008
EP 2010576 B1 1/2009
(Continued)

OTHER PUBLICATIONS

Alt et al., "Biomodal Polyethylene—Interplay of Catalyst and Process," Macromol. Symp. 2001, vol. 163, pp. 135-143.
(Continued)

*Primary Examiner* — Michael M Dollinger
(74) *Attorney, Agent, or Firm* — Cantor Colburn LLP

(57) ABSTRACT

The invention relates to a polyolefin composition comprising A. at least a homopolymer or copolymer of ethylene or propylene and B. cholestanyl ferulate. The composition can be used in the production of articles such as a pipe, cap and closure, film, food contact packaging, biomedical article, health care article and pharmaceutical article.

16 Claims, 1 Drawing Sheet

(51) Int. Cl.
*C08K 5/52* (2006.01)
*C08L 23/12* (2006.01)

(52) U.S. Cl.
CPC ....... *C08L 2203/16* (2013.01); *C08L 2203/18* (2013.01); *C08L 2207/062* (2013.01); *C08L 2207/066* (2013.01)

(56) References Cited

U.S. PATENT DOCUMENTS

| | | | |
|---|---|---|---|
| 6,559,230 | B2 | 5/2003 | Heck et al. |
| 8,729,200 | B2 | 5/2014 | Hermel-Davidock et al. |
| 10,696,827 | B2 * | 6/2020 | Vachon .................. A01N 31/16 |
| 2003/0045616 | A1 * | 3/2003 | Koch ...................... C08L 23/02 524/323 |
| 2010/0234545 | A1 * | 9/2010 | Shim ..................... C08F 210/16 526/170 |
| 2012/0052757 | A1 * | 3/2012 | Hearn ..................... C07B 63/00 442/1 |
| 2017/0029597 | A1 | 2/2017 | Van Mierloo et al. |

FOREIGN PATENT DOCUMENTS

| | | |
|---|---|---|
| EP | 2076551 B1 | 7/2009 |
| EP | 2185611 B1 | 5/2010 |
| EP | 2326654 B1 | 6/2011 |
| EP | 2365990 B1 | 9/2011 |
| WO | WO-2015078886 A1 * | 6/2015 ............... C08K 5/36 |

OTHER PUBLICATIONS

Andrew J. Peacock, "Handbook of Polyethylene Structures, Properties and Applications," Marcel Dekker, Inc., New York, 2000, pp. 43-66.
European Search Report; European Application No. 17157575.6; International Filing Date: Feb. 23, 2017; 3 pages.
International Search Report; International Application No. PCT/EP2018/054279; International Filing Date: Feb. 21, 2018; dated Apr. 4, 2018; 3 pages.
Kale et al. "Structure Property Relationships of Ethylene-1-octene Copolymer and Ethylene-1-butene copolymers Made Using Insite Technology" Polymers, Laminations, and Coatings Conference, 1995, pp. 423-433.
PE 100 Pipe Systems, second edition, Heiner Bromstrup (editor), 2004, pp. 16-20 ISBN 3-8027-2728-2.
Winkler-Moser et al. "Comparison of the Impact of y-Oryzanol and Corn Steryl Ferulates on the Polymerization of Soybean Oil During Frying"; J. Am. Oil Chem. Soc., vol. 89, 2012, pp. 243-252.
Winkler-Moser et al. "Effects of Tocopherols on the Anti-Polymerization Activity of Oryzanol and Corn Steryl Ferulates in Soybean Oil"; J. Am. Oil Chem. Soc., vol. 90, 2013, pp. 1351-1358.
Winkler-Moser et al. "Synthesis of steryl ferulates with various sterol structures and comparison of their antioxidant activity"; Food Chemistry, vol. 169, 2015, pp. 92-101.
Written Opinion; International Application No. PCT/EP2018/054279; International Filing Date: Feb. 21, 2018; dated Apr. 4, 2018; 4 pages.

* cited by examiner

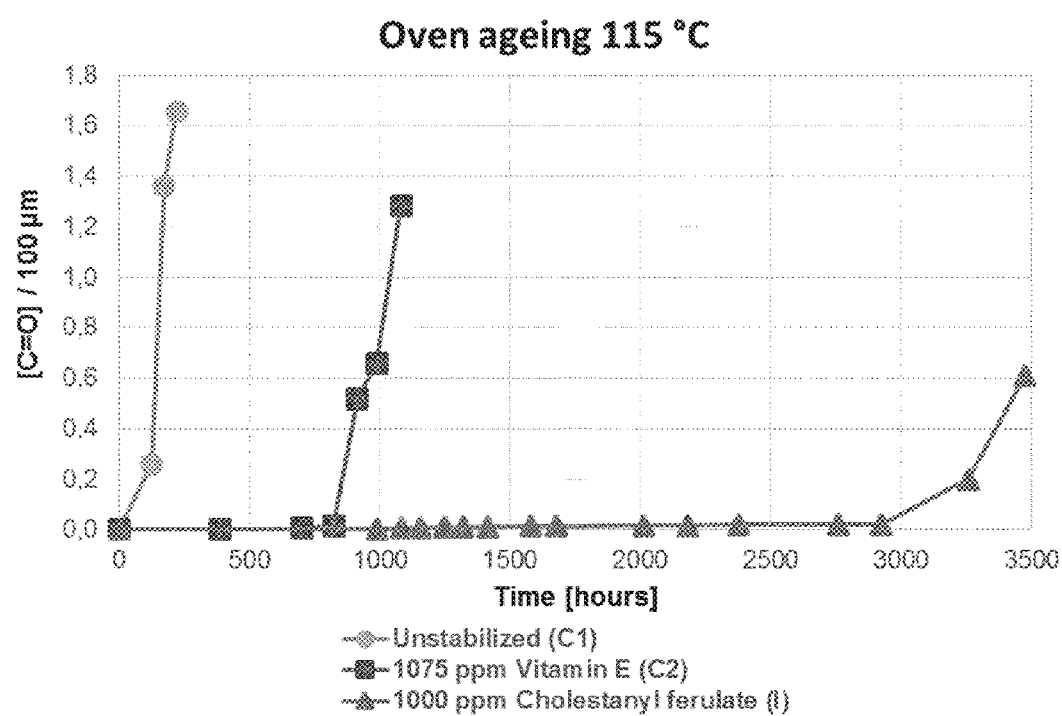

POLYOLEFIN COMPOSITION

CROSS REFERENCE TO RELATED APPLICATIONS

This application is a 371 of International Application No. PCT/EP2018/054279, filed Feb. 21, 2018, which is incorporated by reference in its entirety, and which claims priority to European Application Serial No. 17157575.6 filed Feb. 23, 2017.

The invention relates to a stabilized polyolefin composition.

The stabilization of polyolefin composition is known. Suitable stabilisers are for example synthetic polyphenolic compounds such as tetrakis[methylene-3-(3',5')-di-t-butyl-4-hydroxyphenyl)propionate]methane; 1,1,3-tris(2-methyl-4-hydroxy-5-t-butylphenyl)butane; 1,3,5-trimethyl-2,4,6-tris(3,5-di-t-butyl-4-hydroxybenzyl)benzene; bis-[3,3-bis-(4'-hydroxy-3'-t-butylphenyl butanoic acid]-glycol ester; tris (3,5-di-t-butyl-4-hydroxy benzyl)isocyanurate; 1,3,5-tris(4-t-butyl-2,6-dimethyl-3-hydroxy-benzyl)-isocyanurate; 5-di-t-butyl-4-hydroxy-hydrocinnamic acid triester with 1,3,5-tris(2-hydroxyethyl)-s-triazine-2,4,6(1H,3H,5H)-trione; p-cresol/dicyclopentadiene butylated reaction product and 2,6-bis(2'-bis-hydroxy-3'-t-butyl-5'-methyl-phenyl-4-methyl-phenol).

The stabilized polyolefin compounds may be processed via for example injection moulding, blow moulding, extrusion moulding, compression moulding or thin-walled injection moulding techniques. The obtained products may be applied in a huge amount of applications for example in food contact (packaging) applications, biomedical applications, health care or pharmaceutical applications.

Most of the synthetic phenolic antioxidants used are strictly regulated by governments because they are suffering from serious limitations. Applied synthetic antioxidants could diffuse into the surrounding medium, could contaminate the food or other human-use products with potentially toxic by-product substances. The toxic nature of the surrounding medium may arise simply because some antioxidants are toxic above a certain level of concentration. This may become an issue in certain types of packaging and medical devices. Therefore, the use of such compounds has been related to health risks resulting in strict regulations over their use in food products and this has stimulated research for alternative antioxidant sources. With increased consumer concerns about the amount of chemicals in their foods, convertors are looking for more natural ways to protect their products. In the last few years, there has been an increasing interest in the use of natural additives in preference to synthetic substances for instance for the stabilization of fat-containing food stuff.

A known biobased antioxidant in polyolefin compositions is Vitamin E (for example Irganox® E201 supplied by BASF) which is a racemic mixture of equal amounts of all eight possible stereoisomers of α-tocopherol (RRR, SSS, RRS, RSR, SSR, SRS, SRR, RSS) and is referred to as dl-α-tocopherol or all-rac-alpha-tocopherol.

There is a continuous need to provide improved stabilized polyolefin compositions having no dangerous effects when dispersed in the environment and which also fulfill all requirements related to processing and long term heat stabilization.

The present invention is characterized in that the polyolefin composition comprises A. at least a homopolymer or copolymer of ethylene or propylene and B. cholestanyl ferulate The use of cholestanyl ferulate results in the ability to introduce a biobased antioxidant package with improved radical scavenging ability during service lifetime compared to the well-known biobased antioxidant Vitamin E.

The use of natural occurring antioxidants bearing a significant higher stabilizing activity in polyolefin compositions compared to Vitamin E is surprising.

Additional advantages of the stabilizer composition according to the invention might be the presence of less discoloration issues of the material and also the obtained improved organoleptic properties.

Furthermore the stabilizer composition according to the invention results in improved long term heat stability.

Component A is a homopolymer or copolymer of ethylene or propylene is a polymer produced from olefin monomers, which are monomers comprising at least one carbon-carbon double bond. Examples of suitable homopolymer or copolymer of ethylene or propylene include polypropylene (PP); polyethylene (PE) for example high density polyethylene (HDPE), multimodal high density polyethylene such as bimodal high density polyethylene (bimodal HDPE) and trimodal high density polyethylene, low density polyethylene (LDPE), linear low density polyethylene (LLDPE), metallocene-catalyzed polyethylene, very low density polyethylene (VLDPE), ultrahigh molecular weight polyethylene (UHMWPE) and high performance polyethylene (HPPE); copolymers of ethylene and propylene; copolymers of ethylene or of propylene with another olefin such as butene, 1-hexene and 1-octene; copolymers derived from ethylene or propylene and at least one monomer chosen from methyl acrylate, ethyl acrylate, n-butyl acrylate, methyl methacrylate, acrylic acid, methacrylic acid and carbon monoxide; and copolymers of olefins with a diolefin.

Component A may also be a polyolefin elastomer and include for example ethylene-alpha olefin copolymer. Suitable examples of ethylene-alpha olefin copolymers include for example ethylene-1-octene copolymer and ethylene-1-butene copolymer as described for example by L. T. Kale et al. in "Structure property relationship of ethylene-1-octene copolymer and ethylene-1-butene copolymer made using insite technology" (1995 Polymers, Lamination and coatings Conference, pages 423-433). Suitable alpha olefin copolymers are also disclosed in U.S. Pat. Nos. 8,729,200B2, 6,559,230B2, EP2076551B, EP2326654B, EP2077269B, EP2365990B, EP2010576 and EP2185611B. Preferably the ethylene-alpha olefin copolymer is ethylene-octene copolymer.

Preferably the polyolefin is high density polyethylene, multimodal high density polyethylene, low density polyethylene, linear low density polyethylene or polypropylene for example random polypropylene.

Cholestanyl ferulate (3-O-(trans-4-feruloyl)-β-cholestanol) belongs to the class of steryl ferulates (SFs) which are composed of ferulic acid esterified to a phytosterol and are found in the inner pericarp and aleurone layer of cereal grains such as corn, wheat, rice, rye, and triticale. The antioxidant activity demonstrated by steryl ferulates is attributed to the free radical scavenging activity of the phenolic component (ferulic acid), which means they are categorized as primary AO—radical scavengers.

The structure of a suitable example of cholestanyl ferulate can be illustrated as follow:

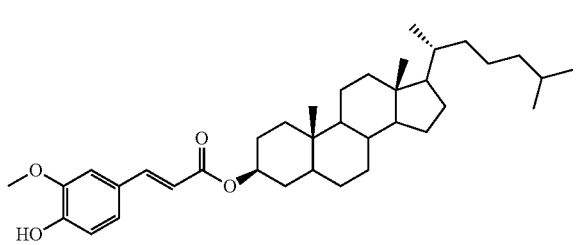 [SMILES: COc1cc(/C=C/C(=O)O[C@H]2CC[C@@]3(C)C(CCC4C3CC[C@@]3(C)C4CCC3[C@H](C)CCCC(C)C)C2)ccc1O]

Steryl ferulates are for example described by WINKLER-MOSER J. K., RENNICK K. A., PALMQUIST D. A., et al. in "Comparison of the impact of gamma-oryzanol and corn steryl ferulates on the polymerization of soybean oil during frying" in Journal of the American Oil Chemists' Society, 89, 243-252 in 2012; by WINKLER-MOSER J. K., et al. in "Effect of Tocopherols on the Anti-Polymerization Activity of Oryzanol and Corn Steryl Ferulates in Soybean Oil" in Journal of the American Oil Chemists' Society, 90, 1351-1358 in 2013; by WINKLER-MOSER J. K., HWANG H.-S., BAKOTA E. L., et al. in "Synthesis of steryl ferulates with various sterol structures and comparison of their antioxidant activity" in Food chemistry 169, 92-101 in 2015.

Preferably the amount of the homopolymer or copolymer of ethylene or propylene in the composition is higher than 95.0 wt % (relative to the total amount of homopolymer or copolymer of ethylene or propylene and cholestanyl ferulate).

Preferably the amount of the homopolymer or copolymer of ethylene or propylene in the composition is lower than 99.95 wt % (relative to the total amount of homopolymer or copolymer of ethylene or propylene and cholestanyl ferulate).

Preferably the amount of cholestanyl ferulate in the composition is lower than 2.0 wt % (relative to the total amount of homopolymer or copolymer of ethylene or propylene and cholestanyl ferulate).

More preferably the amount of cholestanyl ferulate is lower than 1.0 wt %.

Most preferably the amount of cholestanyl ferulate ranges between 0.05 and 0.90 wt %.

It is possible to add other additives to the composition comprising the polyolefin polymer and cholestanyl ferulate.

The polymer composition according to the invention can be applied in the production of many articles. Examples of these articles include pipe, cap and closure, film, food contact packaging, biomedical article, health care article or pharmaceutical article.

A drinking water pipe, preferably a pressure pipe, based on this polymer composition has an improved protection against for example chlorine dioxide containing cold or hot water and consequently a longer life time. It is also possible to transport waste water or water for cooling in the pipe.

According to a further preferred embodiment of the invention the pipe is produced with a composition comprising
A. at least a homopolymer or copolymer of ethylene or propylene and
B. cholestanyl ferulate.

It is possible to add for example phenolic compound and/or organic phosphite and/or phosphonite to the composition for example in amounts between 0.1 and 5.0% by weight (relative to the total polyolefin composition).

Suitable phenolic compounds include for example tetrakis [methylene-3-(3',5'-di-t-butyl-4-hydroxyphenyl)propionate] methane; 1,1,3-tris(2-methyl-4-hydroxy-5-t-butylphenyl) butane; 1,3,5-trimethyl-2,4,6-tris(3,5-di-t-butyl-4-hydroxybenzyl)benzene, bis(3,3-bis(4'-hydroxy-3'-t-butylphenyl)butanoic acid]-glycol ester; tris(3,5-di-t-butyl-4-hydroxy benzyl)isocyanurate; 1,3,5-tris(4-t-butyl-2,6-dimethyl-3-hydroxy-benzyl)isocyanurate; 5-di-t-butyl-4-hydroxy-hydrocinnamic acid triester with 1,3,5-tris(2-hydroxyethyl)-s-triazine-2,4,6(1H,3H,5H)-trione; p-cresol/dicyclopentadiene butylated reaction product; 2,6-bis(2'-bis-hydroxy-3'-t-butyl-5'-methyl-phenyl-4-methyl-phenol).

A preferred polyphenolic compound is 1,3,5-trimethyl-2,4,6-tris(3,5-di-t-butyl-4-hydroxybenzyl)benzene (Irganox 1330 supplied by BASF).

Suitable organic phosphites and phosphonites include for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl) pentaerythritol diphosphite, bisisodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, tetrakis(2,4-di-tert-butylphenyl) 4,4'-biphenylenediphosphonite, 6-isooctyloxy-2,4,8,10-tetra-tert-butyl-12H-dibenzo[d,g]-1,3,2-dioxaphosphocin, 6-fluoro-2,4,8,10-tetra-tert-butyl-12-methyldibenzo[d,g]-1,3,2-dioxaphosphocin, bis(2,4-di-tert-butyl-6-methylphenyl) methyl phosphite, bis(2,4-di-tert-butyl-6-methylphenyl) ethyl phosphite.

A preferred phosphite is tris(2,4-di-tert-butylphenyl) phosphite (Irgafos 168 supplied by BASF).

In the pipe application polyethylene is preferably multimodal ethylene homo- or copolymer for example bimodal or trimodal polyethylene or polypropylene.

Preferably the additives are added during the granulation step of the multimodal, for example bimodal, high density polyethylene powder.

The components may be added together and may be added separately.

Preferably the components are added in one step.

The multimodal ethylene grades to be applied in pipe applications may comprise additives such as for example carbon black, pigments, stearates, a UV stabilizer for example a sterically hindered amine, fillers, minerals, lubricants and/or other stabilisers.

The production processes of polyethylenes are summarised in "Handbook of Polyethylene" by Andrew Peacock (2000; Dekker; ISBN 0824795466) at pages 43-66.

The production processes for multimodal polyethylene such as bimodal high density polyethylene are summarised at pages 16-20 of "PE 100 Pipe systems" (edited by Bromstrup; second edition, ISBN 3-8027-2728-2).

The production of bimodal high density polyethylene via a low pressure slurry process is described by Alt et al. in "Bimodal polyethylene-Interplay of catalyst and process" (Macromol. Symp. 2001, 163, 135-143).

Suitable catalysts for the production of multimodal polyethylene include Ziegler Natta catalysts, chromium based catalysts and single site metallocene catalysts. In all potential possible technologies the process and the catalyst have to form a well-balanced system. The catalyst is crucial for the polymerisation reaction of multimodal polyethylene. By cooperation of process and catalyst a definite polymer structure is produced.

The invention will be elucidated by means of the following non-limiting examples.

EXAMPLES

The following compounds were used:
High density polyethylene (HDPE) (SABIC® HDPE M80064) (unstabilized or reactor powder)
Cholestanyl ferulate (3-O-(trans-4-feruloyl)-β-cholestanol) (purchased from United States Department of Agriculture Agricultural Research Service, Peoria, Ill.)
α-tocopherol (Vitamin E purchased from BASF; Irganox® E201)
775 ppm calcium stearate was present in C2 and I1
Table 1 shows the compositions which were added to HDPE.

TABLE 1

|  | C1 unstabilized | C2 Vitamin E | I Cholestanyl ferulate |
|---|---|---|---|
| α-tocopherol (ppm) | — | 1075 | — |
| Cholestanyl ferulate (ppm) | — | — | 1000 |
| Calcium stearate (ppm) | — | 775 | 775 |

The compositions comprising high density polyethylene (HDPE) (reactor powder SABIC® HDPE M80064) and the compositions according to Table 1 prepared in a Leistritz Micro 27/GL24 Schnecke 10.

Processing Conditions:

| Screw speed | 140 rpm |
| Throughput | 12 kg/h |
| Residence time | 15-35 s |
| Specific energy | 0.15 kW/kg |

Temperature profile (wherein rt=room temperature):

| Zone 1 | rt |
| Zone 2 | rt |
| Zone 3 | 210° C. |
| Zone 4 | 215° C. |
| Zone 5 | 220° C. |
| Zone 6 | 220° C. |
| Melt temperature | 242° C. |

The ability to withstand thermo-oxidative stress in applications for a sufficient long time is determined using oven ageing. A forced air circulation oven for thermal (artificial) ageing provided by Binder GmbH (Model FP 115) with a calibrated air flow meter (set at 12-18 air changes per hour) was used.

Compression moulded films produced with
unstabilized HDPE M80064 (Comparative Example C1)
HDPE M80064 and Vitamin E (Comparative Example C2) and
HDPE M80064 and cholestanyl ferulate (Example I according to the invention) were oven aged at 115° C. Chemical changes due to degradation were monitored via FT-IR measurements.

Long Term Heat Ageing of Films
Compression Molding Films:
For each sample two films (10×10 cm) were compression molded with thickness 80 μm. Thickness tolerance level of 20%.
The press was heated to 160° C.
Once this temperature was reached, the press cycle was the following:
1 minute with a pressure of 15 kN
3 minutes with a pressure of 100 kN
Cooling down with a rate of 35° C./min until room temperature.
Each film was labeled by scratching a name/code in the film.

Set-Up Ovens
In order to prevent direct contact between the films and the metal plates of the oven (avoid oxidation), following set-up was designed: steel bars were wrapped in Teflon tape preventing the films from touching the steel. The bars were put on the plates with metal wire. The films were attached to the bars and held by special magnets which can maintain their magnetism during high temperatures. These magnets were also wrapped in Teflon tape. Films were allowed to slightly overlap each other. For each sample two films were put in the oven, ageing was monitored by FT-IR.

FT-IR
Transmission FT-IR spectra of the films were measured on a Perkin Elmer Spectrum One with a DTGS detector. The spectral resolution was 4 cm−1. Transmission was measured between 4000-400 cm−1. 10 scans were taken of each film.

Degree of oxidation [C═O]/100 μm is determined as the absorbance at 1713 cm−1 corrected to 100 μm film thickness (absorbance 1713 cm−1/film thickness [μm]*100).

Lifetime/time to embrittlement (chemically) is defined as the time at which an upswing in degree of oxidation is detected after subjecting the samples to oven aging at 115° C. under an air flow (see FIG. 1).

FIG. 1 proves that the long term heat performance related to lifetime/time to embrittlement of a polymer composition comprising cholestanyl ferulate is significantly higher compared to the unstabilised polymer and also compared to the polymer composition based on approximately equal amounts of Vitamin E.

The invention claimed is:

1. A polyolefin composition comprising:
   A. at least a homopolymer or copolymer of ethylene or propylene and
   B. cholestanyl ferulate.

2. The composition according to claim 1 characterised in that the homo- or copolymer is
   high density polyethylene, multimodal high density polyethylene, low density polyethylene, linear low density polyethylene or polypropylene.

3. The composition according to claim 2 characterised in that the homo- or copolymer is bimodal polyethylene.

4. An article produced with the polyolefin composition according to claim 1.

5. The article according to claim 4 wherein the article is a pipe, cap and closure, film, food contact packaging, biomedical article, health care article or pharmaceutical article.

6. The article according to claim 5 wherein the article is a pipe and is characterised in that the composition comprises a phenolic compound and organic phosphite and/or phosphonite.

7. The composition according to claim 2 characterised in that the homo- or copolymer is high density polyethylene.

8. The composition according to claim 2 characterised in that the homo- or copolymer is multimodal high density polyethylene.

9. The composition according to claim 2 characterised in that the homo- or copolymer is low density polyethylene.

10. The composition according to claim 2 characterised in that the homo- or copolymer is linear low density polyethylene or polypropylene.

11. An article produced with the polyolefin composition according to claim 2.

12. The article according to claim 11 wherein the article is a pipe, cap and closure, film, food contact packaging, biomedical article, health care article or pharmaceutical article.

13. The article according to claim 12 wherein the article is a pipe and is characterised in that the composition comprises a phenolic compound and organic phosphite and/or phosphonite.

14. An article produced with the polyolefin composition according to claim 3.

15. The article according to claim 14 wherein the article is a pipe, cap and closure, film, food contact packaging, biomedical article, health care article or pharmaceutical article.

16. The article according to claim 15 wherein the article is a pipe and is characterised in that the composition comprises a phenolic compound and organic phosphite and/or phosphonite.

* * * * *